United States Patent [19]

Wood

[11] Patent Number: 5,757,141
[45] Date of Patent: *May 26, 1998

[54] MOSGATE DRIVER FOR BALLAST CIRCUITS

[75] Inventor: Peter N. Wood, Rolling Hills Est., Calif.

[73] Assignee: International Rectifier Corporation, El Segundo, Calif.

[*] Notice: The term of this patent shall not extend beyond the expiration date of Pat. No. 5,545,955.

[21] Appl. No.: 694,649

[22] Filed: Aug. 9, 1996

Related U.S. Application Data

[63] Continuation of Ser. No. 206,123, Mar. 4, 1994, Pat. No. 5,545,955.

[51] Int. Cl.$^6$ ..................................... H05B 37/02
[52] U.S. Cl. ..................... 315/224; 315/DIG. 4; 315/DIG. 5; 315/DIG. 7; 315/308
[58] Field of Search ..................... 315/224, DIG. 4, 315/DIG. 5, DIG. 7, 308, 244, 243, 219, 209 R, 291, 261, 250

[56] References Cited

U.S. PATENT DOCUMENTS

| | | |
|---|---|---|
| 4,060,751 | 11/1977 | Anderson . |
| 4,060,752 | 11/1977 | Walker . |
| 4,251,752 | 2/1981 | Stolz ................................ 315/DIG. 7 |
| 4,441,055 | 4/1984 | Balchjunas et al. . |
| 4,464,406 | 8/1984 | Munson . |
| 4,866,347 | 9/1989 | Nickolls et al. . |
| 4,873,471 | 10/1989 | Dean et al. . |
| 4,933,605 | 6/1990 | Quazi et al. . |
| 5,001,400 | 3/1991 | Nilssen . |
| 5,013,974 | 5/1991 | Nilssen . |
| 5,134,322 | 7/1992 | Bourgeois et al. . |
| 5,214,356 | 5/1993 | Nilssen . |
| 5,258,692 | 11/1993 | Jones . |
| 5,331,253 | 7/1994 | Counts . |
| 5,357,174 | 10/1994 | Nerone et al. . |
| 5,363,020 | 11/1994 | Chen et al. . |
| 5,367,228 | 11/1994 | Kachmarik et al. . |
| 5,387,847 | 2/1995 | Wood . |
| 5,394,064 | 2/1995 | Ranganath et al. . |
| 5,404,082 | 4/1995 | Hernandez et al. . |
| 5,424,611 | 6/1995 | Moriarty, Jr. . |
| 5,514,981 | 5/1996 | Tam et al. . |
| 5,545,955 | 8/1996 | Wood ...................... 315/224 |
| 5,550,436 | 8/1996 | Houk . |
| 5,559,394 | 9/1996 | Wood . |

FOREIGN PATENT DOCUMENTS

| | | |
|---|---|---|
| 0279489 | 8/1988 | European Pat. Off. . |
| 0489477 | 6/1992 | European Pat. Off. . |
| 0583838 | 2/1994 | European Pat. Off. . |
| 2244400 | 11/1991 | United Kingdom . |
| 9011005 | 9/1990 | WIPO . |

OTHER PUBLICATIONS

SGS–Thomson Microelectronics, "L290 Tachometer Converter", Oct. 1991; L291–L298N . . . Oct. 1991.
SGS–Thomson Microelectronics, "L6201 L6202–L6203 DMOS Full Bridge Driver", Oct. 1991; L6204–L6210 . . . , Oct. 1991; PBL3717A Stepper Motor Driver.
SGS–Thomson Microelectronics, "Industrial and Computer Peripheral Ics", Oct. 1988.
SGS–Thomson Microelectronics, "L6202 0.3Ω DMOS Full Bridge Driver", Set. 1988; L6203 . . . , Sep. 1988; TEA3717 Stepper Motor Driver, Sep. 1988.

(List continued on next page.)

*Primary Examiner*—Robert Pascal
*Assistant Examiner*—Michael Shingleton
*Attorney, Agent, or Firm*—Ostrolenk, Faber, Gerb & Soffen, LLP

[57] ABSTRACT

A monolithic MOS gate driver chip is described for driving high side and low side power MOSFETs in a gas discharge lamp ballast circuit. The chip includes a timer circuit for generating a square output at the natural frequency of resonance of the lamp ballast. Dead time circuits are provided in the chip to prevent the simultaneous conduction of both high side and low side MOSFETs. The chip may be housed in a right pin DIP package.

13 Claims, 4 Drawing Sheets

OTHER PUBLICATIONS

International Rectifier, "IGBT Designer's Manual", 1994.

International Rectifier, "HEXFET Designer's Manual", vol. III, Sep. 1993.

Peter N. Wood, "High Frequency Discharge Lamp Ballasts Using Power MOSFETS IGBT's and High Voltage Monolythic Driver", PCI Jun. 1989 Proceedings, pp. 307–324.

International Rectifier, "Half–Bridge Power MOSFET/ IGBT Gate Driver IR 2111", Jan. 13, 1994.

International Rectifier, "High Voltage Bridge Driver IR2110".

International Rectifier—Power MOSFET Application Notes, "High–Speed, High–Voltage IC Driver for HEXFET or IGBT Bridge Circuits", pp. 1–8.

Technology Advances, "Adding 4 Mask Steps To A Power–MOSFET Process Reaps A Unique Suite Of Control Devices".

International Rectifier, "High Voltage current Limiting MOS Gate Driver IR2125".

International Rectifier, "1990 Product Digest".

SGS–Thomson Microelectronics, "L6565 Electronic Lamp Ballast Control Integrated Circuit", Nov. 1993.

SGS–Thomson Microelectronics, "L6566 High Voltage Driver For CFL and TL Lamps", Dec. 1993.

Claudio Contiero, "Multipower–BCD Technology", paper presented at 1st workshop on Smart Power Technologies and Applications, Germany, Sep. 28–29, 1993, pp. 1–3.

Bruno Murari, "Mixed Power IC Technologies And Small System Integration", presented at the 19th European Solid–State Circuits Conference, Spain, Sep. 22–24, 1993, pp. 1–3.

HOLT Integrated Circuits, "HI–930 Electronic Ballast Control, Boost Mode", pp. 2–10.

Siliconix Incorporated, "Answers to Most Commonly Asked Si9910 Applications Questions", pp. 6–7.

Jeffrey G. Mansmann et al., "A Flexible High Voltage Controller Core For Half H N–Channel Bridge Operation", pp. 1–12.

GE, GESmart™ HVIC Half–Bridge 500 VDC Driver.

Dean F. Henderson, "The GS600–Series Driver–An HVIC MOSFET/IGT For Half–Bridge Topologies", RCA Application Note, Sep. 1988.

Donald J. MacIntyre Jr et al., "GESmart™ Module Simplifies Motor Drive Design".

GE, GESmart™ Module Half–Bridge Switch Motor Driver.

Frans A.C.M. Schoofs et al., "A 700–V Interface IC for Power Bridge Circuits", IEEE Journal of Solid–State Circuits, vol. 25, No. 3, Jun. 1990, pp. 677–682.

Philips, "AN170 NE555 and NE 556 applications", Application Note, Dec. 1988.

AT&T Microelectronics, "ATT2161 Low–Side Ballast IC", Advanced Data Sheet, Feb. 1994.

Jean Marie Bourgeois et al., "Optimization of Active Power Factor Corrector".

International Rectifier, "Product Digest Short Form Catalog 1994".

International Rectifier, "IR6000 Intelligent High–Side DMOS Power Switch" preliminary Data Sheet 6.025.

SGS, "Motion Control Application Manual", Jan. 1987.

SGS, "High–Power, Dual–Bridge Ics Ease Stepper–Motor–Drive Design", 1986, pp. 61–67.

SGS, "A Designer's guide To The L290/L291/L292 DC Motor Speed/Position Control System", pp. 107–125.

SGS, "A Second–Generation IC Switch Mode Controller Optimized For High Frequency Power MOS Drive", 1984, pp. 217–226.

SGS, "L290 Tachometer Converter", Dec. 1986, pp. 371–376; L291–L294 . . . . , Dec. 1986, pp. 377–411.

SGS, "L297 L297A Stepper Motor Controllers", Dec. 1986, pp. 443–452; L298N Dual Full–Bridge Driver, Dec. 1986, pp. 453–458.

SGS, "L6202 1.5A DMOS full Bridge Driver", Dec. 1986, pp. 571–577; L6203 . . . . L6207 . . . . L2609 . . . . , Dec. 1986, pp. 579–598.

SGS, "PBL3717A Stepper Motor Driver", Dec. 1986, pp. 765–780; SG1525A/27A Regulating Pulse Width Modulators, Dec. 1986, pp. 781–789.

SGS–Thomson Microelectronics, "L293B L293E Push–Pull Four Channel Drivers", Apr. 1993, pp. 1–12.

SGS–Thomson Microelectronics, "L290 Tachometer Converter", Mar. 1993, pp. 1–8.

SGS, "Linear Integrated Circuit", Advance Data, Mar. 1983, pp. 187–195.

SGS, "L293 Linear Integrated Circuit", Preliminary Data, Oct. 1980, pp. 122–129.

SGS, "TDA 1170 Linear Integrated Circuit", Oct. 1980, pp. 428–435.

SGS, "L290 Linear Integrated Circuit", Preliminary Data, Oct. 1980, pp. 98–103.

SGS, "PBL3717A Linear Integrated Circuits", Preliminary Data, Dec. 1984.

SGS, "L298 Linear Integrated Circuit", Advance Data, Jun. 1982.

SGS, "L295 Linear Integrated Circuit", Advance Data, Jun. 1982.

C. Cini et al., "A High Efficiency Mixed Technology Motor Driver IC", presented at PCI 1985, Italy.

SGS, "L6202 1.2A DMOS Full Bridge Driver", Advance Data, pp. 1–7.

SGS–Thomson Microelectronics, "Industrial and Computer Peripheral Ics", Databook, 2nd Edition, Feb. 1992.

PCI Proceedings, 1989, pp. 316–324.

"High Voltage Versatility" *Electronics World & Wireless World*, Oct. 1994, pp. 837–839.

Wood, "Electronic Ballasts Using the Cost–Savings IR–2155 Driver", International Rectifier Application Notes made available to the public on or before Feb. 1994 AN–995, pp. 2–4.

Chryssis, "High–Frequency Switching Power Supplies Theory & Design", 2d Ed., pp. 50, 53 and 183–208, 1989.

UK Patent Search Report dated May 9, 1995.

MOSGATE DRIVER FOR BALLAST CIRCUITS

This is a continuation of application Ser. No. 08/206,123, filed Mar. 4, 1994, which issued on Aug. 13, 1996 as U.S. Pat. No. 5,545,955.

BACKGROUND OF THE INVENTION

This invention relates to a gate driver circuit for MOS gated devices, and more specifically relates to a monolithic gate driver circuit for MOS gated circuit devices, particularly those used in lamp ballast circuits.

Electronic ballasts for gas discharge circuits are coming into widespread use because of the availability of power MOSFET switching devices to replace previously used power bipolar transistor devices. Most electronic ballasts use two power MOSFET switches in a totem pole (half bridge) topology, with the gas discharge tube circuits consisting of L-C series resonant circuits in which the lamp or lamps are connected across one of the reactances of the L-C circuit. The power MOSFET switches are then driven to conduct alternately by inputs from secondary windings on a current transformer, the primary winding of which conducts the current of the lamp circuits. The primary winding current alternates at the resonant frequency of the resonant circuit.

Such prior art circuits have numerous drawbacks. For example, such circuits:

1. Are not self-starting and require a DIAC type device to initially pulse the circuit into operation.

2. They have poor switch times.

3. They are labor intensive due particularly to the need for a toroidal current transformer.

4. The circuits are not amenable to dimming.

5. The circuits are not amenable to mass production manufacture.

BRIEF SUMMARY OF THE INVENTION

The present invention provides a novel monolithic MOS gate driver which permits the driving of low side and high side power MOSFETS or IGBTs (or any other MOS gated type device) from logic level, ground referenced inputs. Such circuits are particularly well adapted for the driving of gas discharge lamp ballast circuits.

More specifically, the MOS gate driver of the invention can be used for the drive of lamp ballast circuits or, more generally, any desired MOS gated circuit, and provides the following features:

1. It provides gate drive voltage signals for two MOS gated power semiconductors such as power MOSFETs or IGBTs, one designated as a "Low-side switch" and the other as a "High-side switch". The two power switches are commonly connected in a totem pole or half-bridge circuit.

2. It provides level shifting circuits with a voltage offset capability up to about 600 volts to translate ground (substrate) referenced signals via an isolated portion of the silicon die to facilitate the drive function of the high side switch.

3. A logic circuit referenced to ground (substrate) that consists of comparators, a voltage regulator to control the magnitude of the output signals when the driver is supplied from non-regulated d-c supplies, undervoltage lockout circuits to prevent marginal operation of the MOS power switches, both low side and high side, a dead band delay circuit that prevents "shoot through" currents from flowing in the MOS power switches, and a logic function that allows the high side and low side drive outputs to alternate on a 50% time basis.

4. An additional logic output is provided so that the driver can self-oscillate at a frequency determined by external resistors and capacitors $R_T$ and $C_T$, respectively, where the frequency of oscillation $f_o$ is set by the relationship:

$$f_o = \frac{1}{1.4\, R_T \times C_t}$$

5. The monolithic die can be packaged in a conventional 8-pin DIP or SMD package.

DETAILED DESCRIPTION OF THE DRAWINGS

DETAILED DESCRIPTION OF THE DRAWINGS

Figure 1:
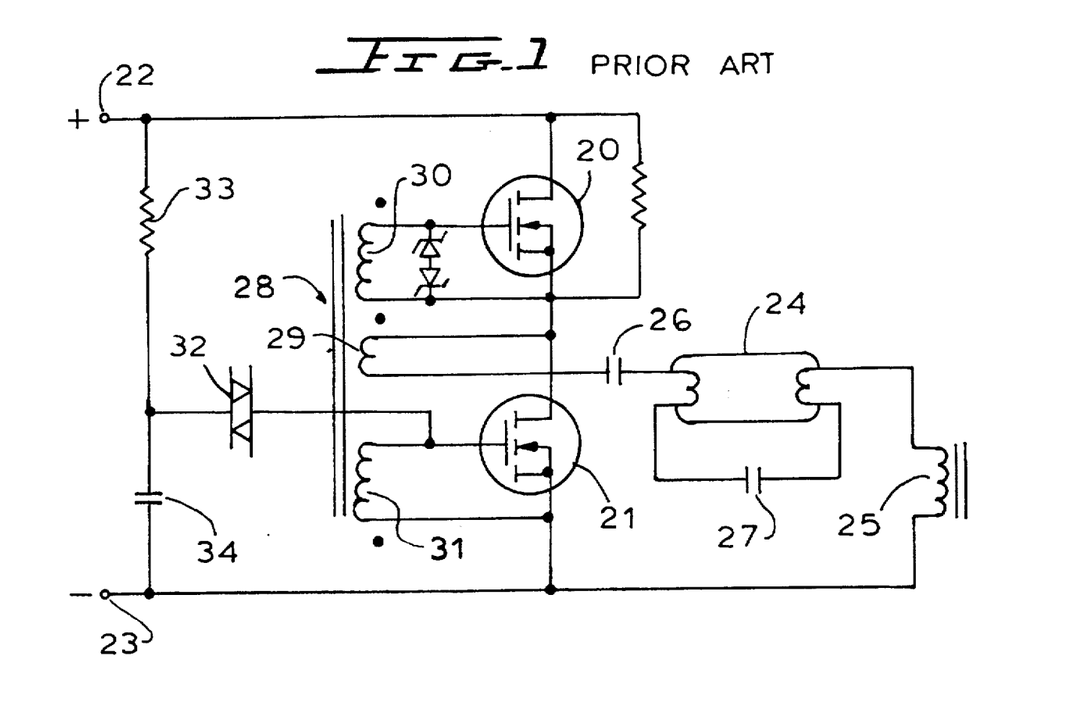
FIG. 1 shows a prior art electronic ballast using a current transformer drive.

Referring first to FIG. 1, there is shown a prior art ballast using a current transformer drive. The circuit employs power MOSFETs 20 and 21 connected in a "totem pole", a half-bridge circuit, and driven from a d-c power source at terminals 22 and 23. The output circuit includes a gas discharge tube 24 of any desired type which is connected to a series L-C circuit consisting of inductor 25 and capacitors 26–27. A current transformer 28 has a primary winding 29 in series with tube 24 and secondary windings 30 and 31 connected to the gates of MOSFETs 20 and 21, respectively. A diac 32 is connected from the node between resistor 33 and capacitor 34 and the gate of MOSFET 21 to provide a starting pulse to start the circuit into oscillation. Once started, the circuit will operate at the resonant frequency of inductor 25 and capacitor 26.

More specifically, after MOSFET 21 turns on, oscillation is sustained, and a high frequency (30 to 80 kHZ) excites the L-C circuit. The sinusoidal voltage across capacitor 27 is magnified by the circuit Q at resonance, and develops a sufficient magnitude to strike the lamp 24.

The circuit of FIG. 1 is a holdover from known ballast designs using bipolar transistors and is not well suited to power MOSFETs because of poor waveforms.

The novel monolithic chip of the invention permits the drive of a ballast circuit which is self-starting, has improved switching time, is amenable to dimming, and avoids labor intensive inductor components such as the current transformer 28 of FIG. 1.

Figure 2:
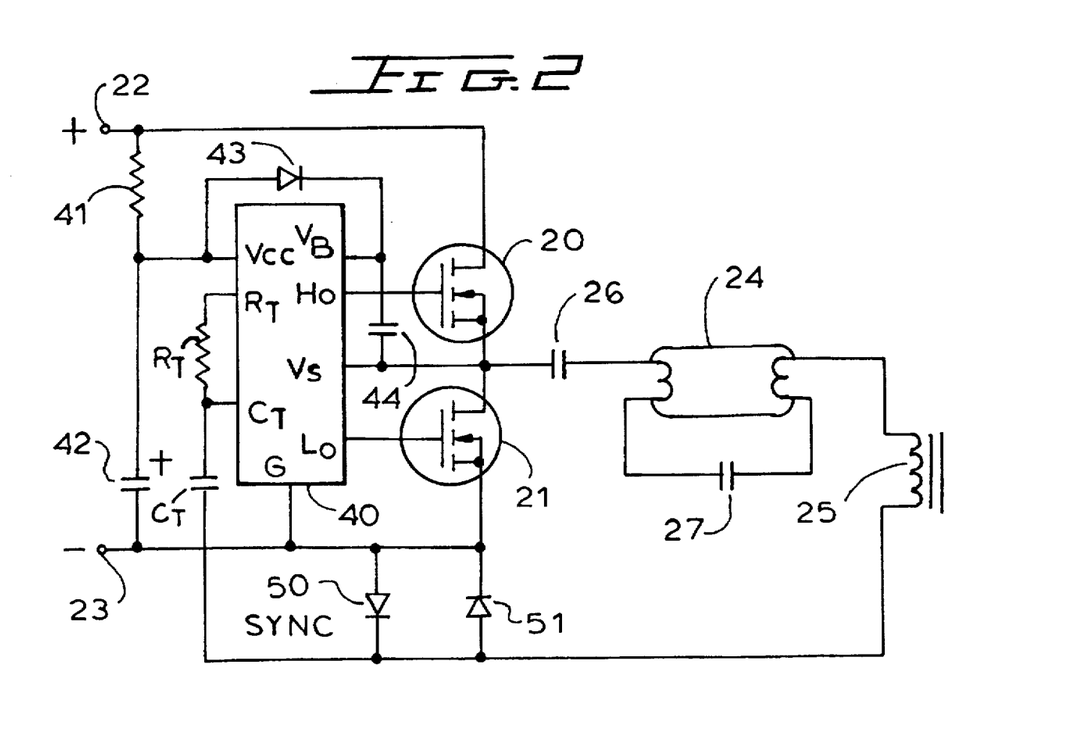
FIG. 2 shows a generalized electronic ballast for gas discharge lamps, which uses the monolithic circuit of the present invention.

FIG. 2 shows the novel monolithic MOS gate driver 40 of the invention in the ballast circuit of a gas discharge lamp. More specifically, the circuit of FIG. 2 has a gas discharge lamp 24 associated with the series L-C circuits 25, 26, 27 as in FIG. 1. Two power MOSFETs 20 and 21 are also connected to d-c source terminals 22 and 23 as in FIG. 1. Power MOSFETs 20 and 21 may be any power device which has a MOS gate, for example, an IGBT or a MOS gated thyristor. The chip 40 of FIG. 2 provides drive signals to the MOSFETs 20 and 21 which avoids the drawbacks of the prior art circuit of FIG. 1.

More specifically, chip 40 may be housed in an 8-pin DIP or surface mount package, and has the following pinouts:

H$_O$—an output pin to the gate of the high side MOSFET 20;

V$_S$—a pin to the center tap of the totem-pole or half bridge connected MOSFETs 20 and 21.

L$_O$—an output pin to the gate of the low side MOSFET 21.

G—a pin connected to the negative terminal 23 of the d-c source.

C$_T$—a single input control pin which is connected to the node between timing capacitor C$_T$ and timing resistor R$_T$. The other side of capacitor C$_T$ is connected to inductor 25. Control signals to single pin C$_T$ controls both outputs H$_o$ and L$_o$.

R$_T$—a pin which is connected to the other terminal of timing resistor R$_T$.

V$_{CC}$—a pin which receives a chip operating voltage from the node between resistor 41 and capacitor 42.

V$_B$—a pin connected to the node of diode 43 and capacitor 44, which acts as a "bootstrap" circuit to provide power for the operation of the high side switch.

Also provided in FIG. 2 are two back-to-back diodes 50 and 51 in series with the lamp circuit. These diodes 50 and 51 form a zero-crossing detector for lamp 24.

In operation, and before tube 24 strikes, the resonant circuit consists of inductor 24 and both capacitors 26 and 27. The capacitance of capacitor 27 is lower than that of capacitor 26 so that it operates at a higher a-c voltage than that of capacitor 26. This voltage on capacitor 27 strikes the lamp 24. After lamp 24 strikes, capacitor 27 is effectively short circuited by the lamp voltage drop and the frequency of the resonant lamp circuit now depends on inductor 25 and capacitor 26.

This causes a shift to a lower resonant frequency during normal operation, synchronized by the zero crossing of the a-c current at diodes 50 and 51, and using the resultant voltage to control the oscillator within chip 40. As will be shown, the oscillation frequency of the circuit is synchronized by the addition of resistor R$_T$ and capacitor C$_T$.

The chip 40 provides offset voltage capability up to or higher than 600 volts d-c and has a "front end" capability similar in function to that of the well known CMOS 555 timer i.c.

Chip 40 also has interior circuitry to provide a nominal 1 microsecond dead time between outputs of the alternating high side and low side outputs for driving switches 20 and 21.

As will also be later shown, the chip 40 will be supplied at terminal 22 by a rectified a-c voltage and, therefore, is designed for a minimum quiescent current, and has a 15 volt interval shunt regulator. Thus, a single one-half watt dropping resistor 41 can be used.

In addition to the quiescent current there are two other components of d-c supply current that are a function of the actual application circuit.

1) Current due to charging the input capacitance of the power switches.

2) Current due to charging and discharging the junction isolation capacitance of the gate driver chip.

Both components of current are charge related and therefore follow the rules:

$$Q=CV$$

It can readily be seen, therefore, that to charge and discharge the power switch input capacitances, the required charge is a product of the gate drive voltage and the actual input capacitances and the input power required is directly proportional to the product of charge and frequency and voltage squared:

$$Power = \frac{CV^2}{2} \times f$$

When designing an actual ballast circuit and because of the above relationships, the following should be observed:

1) Select the lowest operating frequency consistent with minimizing inductor size.
2) Select the smallest die size for the power switches consistent with low conduction losses. (This reduces the charge requirements.)
3) Use the lowest possible d-c voltage.

In summary, the circuit of FIG. 2, when driven by chip 40, provides a self-oscillating square wave generator with dead time control and level shifting for the MOS gated devices in the circuit. Unlike the prior art current transformer driver, the novel system provides clean "text book" waveforms to minimize switch losses. In many cases, smaller size MOSFETs can be selected or, alternatively, heat sinks may be reduced or eliminated.

Figure 3:
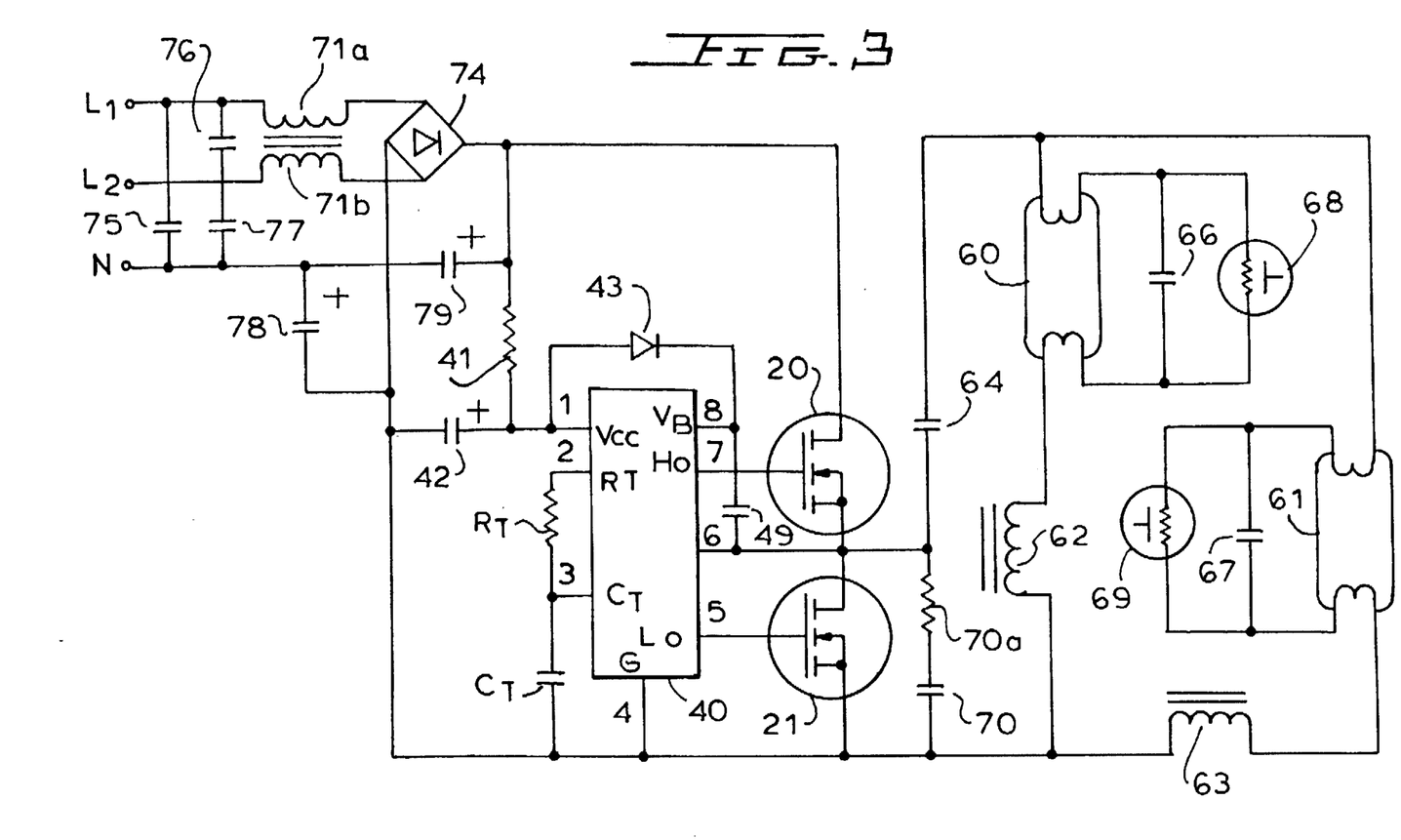
FIG. 3 shows a circuit diagram of a "double 40" fluorescent ballast, which uses the monolithic MOS gate driver of the invention.

FIG. 3 shows an exemplary ballast circuit which could employ the chip 40 of the FIG. 2 for a "double 40" fluorescent lamp ballast. In FIG. 3, components similar to those of FIG. 2 have the same identifying numerals. The lamp circuit in FIG. 3 employs two 40 watt fluorescent lamps 60 and 61 in a common reflector which have respective series inductors 62 and 63 and series capacitor 64. Each of tubes 60 and 61 have parallel capacitors 66 and 67, respectively, and parallel positive temperature coefficient thermistors 68 and 69, respectively. A snubber consisting of capacitor 70 and resistor 70a is connected from the node between MOSFETs 20 and 21 to the neutral line.

The input a-c circuit includes an a-c source having two a-c terminals L$_1$, and L$_2$ and a neutral terminal N. A conventional filter circuit including 30 microhenry inductors 71a and 71b is connected to a single phase full wave rectifier 74 having a positive output connected to resistor 41 and a negative terminal connected to capacitor 42, providing a 320 volt d-c output from a 220 volt a-c input. The input filter further includes capacitors 75, 76 and 77 as well as d-c capacitors 78 and 79.

Note that chip 40 of FIG. 3 operates directly off the d-c bus through dropping resistor 41 and oscillates at around 45 kHz in compliance with the following relationship:

$$f_{OSC} = \frac{1}{1.4 \, R_T C_T}$$

Power for the high side switch gate drive comes from bootstrap capacitor 44 (0.1 µF) which is charged to approximately 14 volts whenever pin V$_S$ is pulled low during the low side power switch conduction. The bootstrap diode 43 (11DF4) blocks the d-c bus voltage when the high side switch conducts. Diode 43 is a fast recovery diode (<100 nSec) to ensure that the bootstrap capacitor 44 is not partially discharged as the diode 43 recovers and blocks the high voltage bus.

The high frequency output from the half bridge 20–21 is a square wave with very fast transition times (approximately 50 nSec). In order to avoid excessive radiated noise from the fast wave fronts, a 0.5 watt snubber 70–70a (10Ω and 0.001 μF, respectively), is used to slow down the switch times to approximately 0.5 μSec. Note that there is a built-in dead time of 1 μSec to prevent shoot-through currents in the half bridge.

The fluorescent lamps 60 and 61 are operated in parallel, each with its own L-C resonant circuit. Any number of tube circuits can be driven from the single pair of MOSFETs 20 and 21 sized to suit the power level.

The reactance values for the lamp circuit are selected from L-C reactance tables or from the equation for series resonance:

$$f = \frac{1}{2\pi\sqrt{LC}}$$

The Q of the lamp circuits is fairly low because of the need for operation from a fixed frequency which, of course, can vary because of $R_T$ and $C_T$ tolerances. Fluorescent lamps do not normally require very high striking voltages so a Q of two or three is sufficient. "Flat" Q curves tend to result from larger inductors and small capacitor ratios where:

$$Q = \frac{2\pi fL}{R}$$

and R tends to be larger as more turns are used.

Soft-starting with tube filament pre-heating is accomplished by P.T.C. thermistors 68 and 69 across each lamp. In this way the voltage across the lamp gradually increases as the P.T.C. thermistor self-heats until finally the striking voltage with hot filaments is reached and the lamp strikes.

The following table gives the values of components used for a preferred embodiment of FIG. 3:

| MOSFETs 20, 21 | Type IRF 720 (International Rectifier) |
| --- | --- |
| PTC 68, 69 | TDK 911P97ES014U10 |
| Bridge 74 | 4 × IN 4007 |
| Diode 43 | 11DF4 |
| Resistor 41 | 91K OHMS, ½ watt |
| Resistor 70a | 10 OHMS, ½ watt |
| Resistor $R_T$ | 15K OHMS |
| Capacitor 42 | 47 μf, 20 v |
| Capacitor 64 | 1 μf, 400 v |
| Capacitor | |
| 66, 67 | 0.01 μf, 600 v |
| 70 | 0.001 μf, 600 v |
| 75, 76, 77 | 0.22 μf, 250 v a-c |
| 78, 79 | 100 μf, 200 v |
| $C_T$ | 0.001 μf |
| Inductors 62, 63 | 1.35 millihenry |

Figure 4:
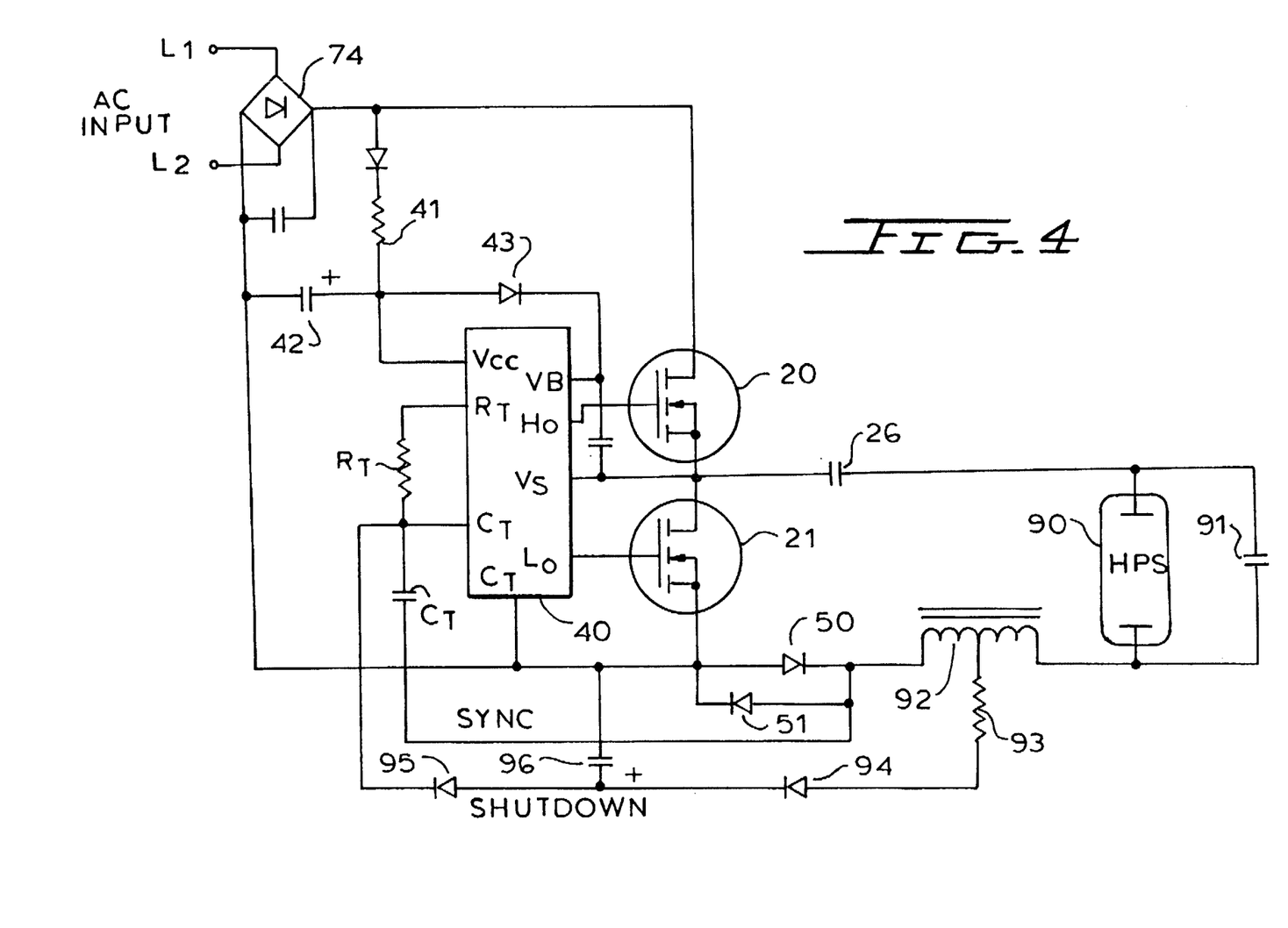
FIG. 4 shows a circuit diagram of a high pressure sodium ballast, using the novel MOS gate driver of the present invention.

FIG. 4 shows another embodiment of the invention for the drive of a high pressure sodium lamp ballast. The circuit of FIG. 4 has the synchronization circuit of FIG. 2 and also has an automatic shut-down circuit. In FIG. 4, components similar to those of FIGS. 2 and 3 have similar identifying numerals. In FIG. 4, the lamp is a high pressure sodium lamp 90 having a parallel capacitor 91 and an inductor 92. Inductor 92 has a tap which is part of a shut-down circuit, and includes resistor 93, diodes 94 and 95 and capacitor 96.

In FIG. 4, the synchronizing circuit consists of the zero crossing detector diodes 50 and 51 which synchronize the self-oscillation frequency to the true resonance of the LC circuit 91, 92. The Q of the series resonant circuit is made to be about 20 and provides sufficient voltage to strike lamp 90. The synchronizing capability of the chip 40 allows the series tuned circuit of FIG. 4 to resonate at high Q to provide the 3 kv starting voltage for lamp 90 without the use of a separate igniter.

In a hot restrike situation, where Q is insufficient to provide the necessary restrike voltage, the shutdown circuit including diodes 95 and 96 provides a d-c bias voltage which prevents the voltage at pin CT from reaching the ⅓ $V_{CC}$ valley switching point. Thus, the circuit provides "burps" of oscillation until restrike is accomplished (approximately 90 seconds) and sustained, and destructive high MOSFET currents avoided.

Figure 5:
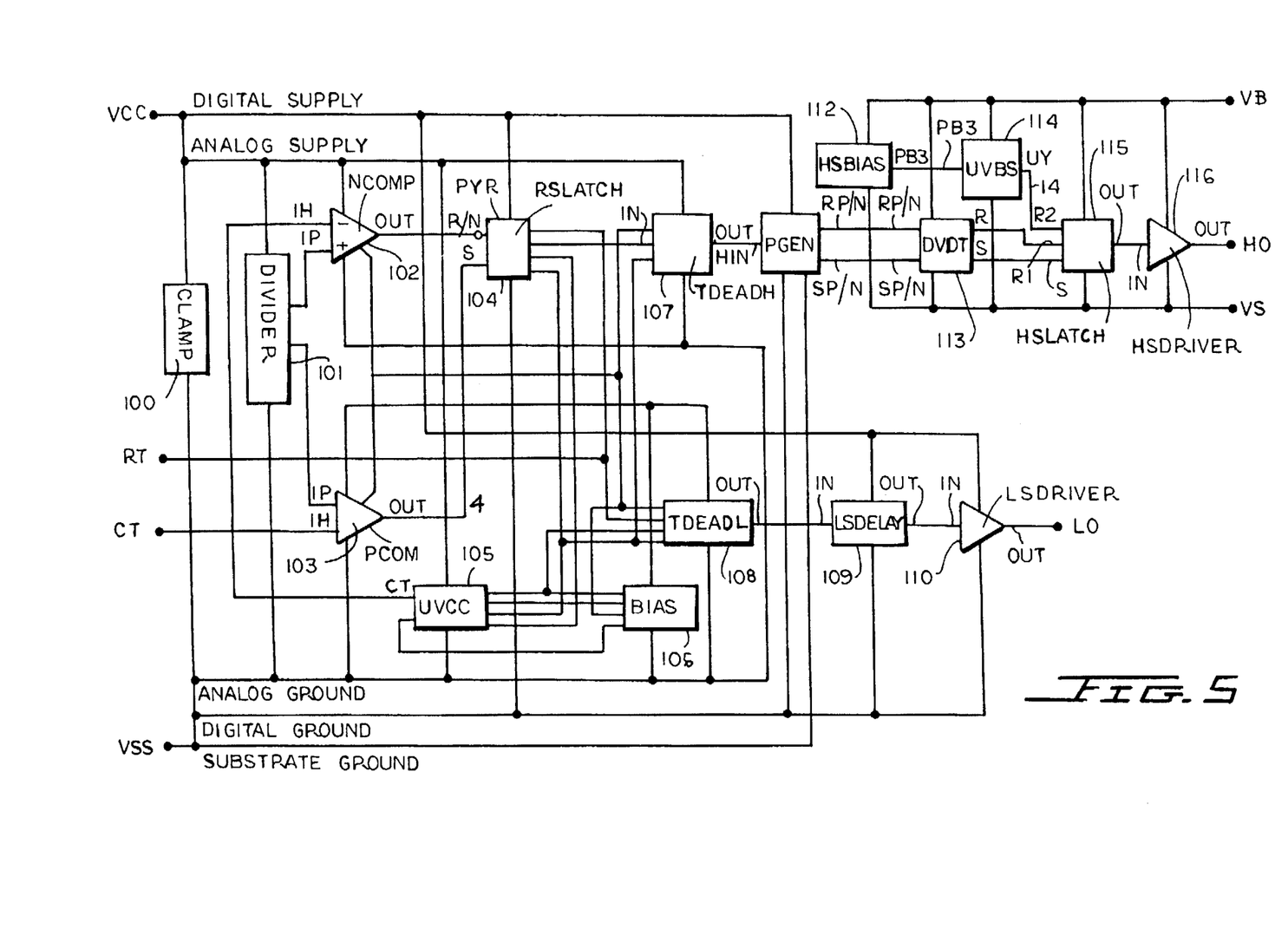
FIG. 5 is a block diagram of the novel monolithic gate driver shown in FIGS. 2, 3 and 4.

FIG. 5 is a block diagram of the circuit of chip 40 of the preceding FIGS. 2, 3 and 4. The eight pinouts of chip 40 are repeated in FIG. 5. All circuit blocks to be described in FIG. 5 are integrated into a common silicon chip. The first circuit block is the clamp circuit 100, consisting of a plurality of zener diodes. These are connected from pin $V_{CC}$ and pin $V_{SS}$ which is connected to the silicon substrate which acts as the chip ground. A digital supply line and analog supply line both extend from pin $V_{CC}$. An analog ground line and a digital ground line are also connected to pin $V_{SS}$.

The next group of circuit blocks form a timer circuit. These include divider circuit 101 connected to the analog supply line to the analog ground, N comparator 102, P comparator 103 and an RS latch 104. Two taps from divider 101 are connected to the positive inputs of comparators 102 and 103. Input pin $C_T$ is connected to the negative input of comparator 103. The output of comparators 102 and 103 are connected to the RS latch 104 as shown.

The RS latch 104 is also connected to undervoltage lock-out circuit 105 which is integrated into the chip circuit. Thus if $V_{CC}$ reduces too low, the RS latch 104 is locked out.

A bias circuit 106 provides bias outputs to the RS latch 104, the lockout circuit 105, and to dead time delay circuits 107 and 108 in the high side and low side circuit lines. Time delay circuits 107 and 108 provide a dead time or delay of about 1 microsecond between the turn on of the high side or low side switch after the turn off of the other. This dead time ensures that a "shoot through" circuit cannot be formed in which both power MOSFETs 20 and 21 are simultaneously on.

The output of dead time circuit 108 is applied to low side delay circuit 109 and low side driver 110 which is connected to pin $L_O$.

The output of dead time circuit 107 is applied to level shift pulse generator 111 in the high side output line. The high side line also includes a high side bias supply circuit 112 which drives a dv/dt filter circuit 113 which filters noise from the pulse passed by circuit 113, and an under-voltage analog lockout circuit 114. The input to the high side bias circuit 112 is connected to pin $V_B$.

The output of lockout circuit 114 and dv/dt filter 113 is applied to latch circuit 115 and its output is connected to buffer 116 which contains gain stages and drives pin $H_O$. Note that pin $V_{SS}$ is connected to circuits 113, 114, 115 and 116.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An electronic ballast circuit including, in combination, at least one gas discharge lamp, at least one L-C circuit in series with said gas discharge lamp, first and second series connected MOS gate controlled power switching devices having respective gate terminals and connected in a half bridge circuit arrangement, a pair of d-c power terminals connected in series with said first and second series connected switching devices; said lamp and L-C series circuit connected across said second power switching device, and a gate drive circuit having an input terminal for receiving input logic level signals for alternately switching on and off both of said first and second MOS gated devices at a given frequency of oscillation; said gate drive circuit having output terminals $H_O$ and $L_O$ coupled to the respective gates of said discrete devices; said gate drive circuit having a terminal $V_{CC}$ which provides the operating power for its internal circuitry; an external resistor for connecting said terminal $V_{CC}$ to one of said pair of terminals; said gate drive circuit having a substrate for carrying the components of said gate drive circuit; and a clamp circuit within said gate drive circuit; said clamp circuit having a first terminal connected to said terminal $V_{CC}$ and a second terminal connected to a ground terminal of said substrate.

2. The device of claim 1 in which said clamp circuit consists of a plurality of zener diodes.

3. An integrated circuit formed in a silicon substrate for driving first and second MOS gated power devices which are connected in a half bridge circuit which has first and second d-c terminals and a common terminal at the node between said first and second MOS gated power devices; said integrated circuit including timer circuit means having an input control terminal $C_T$ which is connectable to a low logic level signal referenced to the potential of said substrate; latch circuit means coupled to said timer circuit means for controlling the frequency at which said first and second MOS devices are switched on and off and having an output which is switched in response to a predetermined signal applied to said input control terminal; a high side dead time delay circuit and a low side dead time delay circuit each coupled to said latch circuit means for delaying the transmission of a latch output signal for a predetermined time delay following the switching of the output of said latch circuit means; a high side level shifting means and a high side driver circuit means and a low side driver circuit means; said high side driver circuit means; and said low side driver means coupled to said high side dead time circuit and said low side dead time circuit, respectively, and having a high side and low side output pins, respectively, which produce outputs for turning on and off said first and second MOS gated power devices in response to control signals at said input control terminal $C_T$; said dead time delay circuits preventing the simultaneous conduction of said first and second MOS gated power devices; and undervoltage trip circuit means coupled to and monitoring the voltage at said $V_{CC}$ pin and having an output coupled to said latch circuit means and to said high side and low side dead time circuits for disabling said latch circuit means and delay circuits when the voltage at said $V_{CC}$ pin falls below a given value.

4. A self-starting electronic ballast circuit including, in combination, at least one gas discharge lamp, at least one L-C circuit in series with said gas discharge lamp, first and second series connected MOS gate controlled power switching devices having respective gate terminals and connected in a half bridge circuit arrangement, a pair of d-c power terminals connected in series with said first and second series connected switching devices; said lamp and L-C series circuit connected across said second power switching device, and a gate drive circuit having an input terminal for receiving input logic level signals for alternately switching on and off both of said first and second MOS gated devices at a given frequency of oscillation; said gate drive circuit having output terminals $H_O$ and $L_O$ coupled to the respective gates of said power switching devices; said gate drive circuit having a terminal $V_{CC}$ which provides the operating power for its internal circuitry; and an external resistor for connecting said terminal $V_{CC}$ to one of said pair of terminals; said circuit becoming operable and started in response to the application of d-c voltage to said pair of d-c power terminals; said circuit being free of diac components for starting.

5. A self-starting electronic ballast circuit including, in combination, at least one gas discharge lamp, at least one L-C circuit in series with said gas discharge lamp, first and second series connected MOS gate controlled power switching devices having respective gate terminals and connected in a half bridge circuit arrangement, a pair of d-c power terminals connected in series with said first and second series connected switching devices, said lamp and L-C series circuit connected across said second power switching device, and a gate drive circuit having an input terminal for receiving input logic level signals for alternately switching on and off both of said first and second MOS gated devices at a given frequency of oscillation; said gate drive circuit having output terminals $H_O$ and $L_O$ coupled to the respective gates of said power switching devices; said gate drive circuit having an oscillation timer circuit having first and second input pins $R_T$ and $C_T$ respectively, and a discrete resistor and a discrete capacitor connected to pins $R_T$ and $C_T$ respectively to set said given frequency of oscillation at a given frequency and at the frequency of oscillation of said L-C circuit; said circuit becoming operable and started in response to the application of d-c voltage to said pair of d-c power terminals; said circuit being free of diac components for starting.

6. A self-starting electronic ballast circuit including, in combination, at least one gas discharge lamp, at least one L-C circuit in series with said gas discharge lamp, first and second series connected MOS gate controlled power switching devices having respective gate terminals and connected in a half bridge circuit arrangement, a pair of d-c power terminals connected in series with said first and second series connected switching devices; said lamp and L-C series circuit connected across said second power switching device, and a gate drive circuit having an input terminal for receiving input logic level signals for alternately switching on and off both of said first and second MOS gated devices at a given frequency of oscillation; said gate drive circuit having output terminals $H_O$ and $L_O$ coupled to the respective gates of said power switching devices; said gate drive circuit having a terminal $V_{CC}$ which provides the operating power for its internal circuitry; and an external resistor for connecting said terminal $V_{CC}$ to one of said pair of terminals; said gate drive circuit having an oscillation timer circuit having first and second input pins $R_T$ and $C_T$ respectively, and a discrete resistor and a discrete capacitor connected to pins $R_T$ and $C_T$ respectively to set said given frequency of oscillation at a given frequency and at the frequency of oscillation of said L-C circuit; said circuit becoming operable and started in response to the application of d-c voltage to said pair of d-c power terminals; said circuit being free of diac components for starting.

7. A self-starting electronic ballast circuit including, in combination, at least one gas discharge lamp, at least one L-C circuit in series with said gas discharge lamp, first and second series connected MOS gate controlled power switching devices having respective gate terminals and connected in a half bridge circuit arrangement, a pair of d-c power terminals connected in series with said first and second series connected switching devices; said lamp and L-C series circuit connected across said second power switching device, and a monolithic gate drive circuit having an input terminal for receiving input logic level signals for alternately switching on and off both of said first and second MOS gated devices at a given frequency of oscillation; said gate drive circuit having output terminals $H_O$ and $L_O$ coupled to the respective gates of said discrete devices; said gate drive circuit having a terminal $V_{CC}$ which provides the operating power for its internal circuitry; and an external resistor for connecting said terminal $V_{CC}$ to one of said pair of terminals; said integrated circuit including timer means having an input control terminal $C_T$ which is connectable to a low logic level signal referenced to the potential of said substrate; latch circuit means coupled to said timer circuit means for controlling the frequency at which said first and second power switching devices are switched on and off and having an output which is switched in response to a predetermined signal affixed to said input control terminal; a high side dead time delay circuit and a low side dead time circuit each coupled to said latch circuit means for delaying the transmission of a latch output signal for a predetermined time delay following the switching of the output of said latch circuit means; a high side level shifting means and a high side driver circuit means and a low side driver circuit means; said high side driver circuit means and said low side driver circuit means coupled to said high side dead time circuit and said low side dead time circuit means respectively and having high side and low side output pins respectively which produce outputs for turning on and off said first and second MOS gated power devices in response to control signals at said input control terminal $C_T$; said dead time delay circuits preventing the simultaneous conduction of said first and second MOS gated power devices; said circuit becoming operable and started in response to the application of d-c voltage to said pair of d-c power terminals; said circuit being free of diac components for starting.

8. A self-starting electronic ballast circuit including, in combination, at least one gas discharge lamp, at least one L-C circuit in series with said gas discharge lamp, first and second series connected MOS gate controlled power switching devices having respective gate terminals and connected in a half bridge circuit arrangement, a pair of d-c power terminals connected in series with said first and second series connected switching devices; said lamp and L-C series circuit connected across said second power switching device, and a gate drive circuit having an input terminal for receiving input logic level signals for alternately switching on and off both of said first and second MOS gated devices at a given frequency of oscillation; said gate drive circuit having output terminals $H_O$ and $L_O$ coupled to the respective gates of said MOS power switching devices; said gate drive circuit having an oscillation timer circuit having first and second input pins $R_T$ and $C_T$ respectively, and a discrete resistor and a discrete capacitor connected to pins $R_T$ and $C_T$ respectively, to set said frequency of oscillation at said given frequency of oscillation of said L-C circuit; said integrated circuit including timer means having an input control terminal $C_T$ which is connectable to a low logic level signal referenced to the potential of said substrate; latch circuit means coupled to said timer circuit means for controlling the frequency at which said first and second discrete devices are switched on and off and having an output which is switched in response to a predetermined signal affixed to said input control terminal; a high side dead time delay circuit and a low side dead time circuit each coupled to said RS latch circuit for delaying the transmission of a latch output signal for a predetermined time delay following the switching of the output of said latch circuit means; a high side level shifting means and a high side driver circuit means and a low side driver circuit means; said high side driver circuit means and said low side driver circuit means coupled to said high side dead time circuit means and said low side dead time circuit means respectively and having high side and low side output pins respectively which produce outputs for turning on and off said first and second MOS gated power devices in response to control signals at said input control terminals $C_T$; said dead time delay circuits preventing the simultaneous conduction of said first and second MOS gated power devices; said circuit becoming operable and started in response to the application of d-c voltage to said pair of d.c. power terminals; said circuit being free of diac components for starting.

9. The self-starting circuit of claim 4 wherein said MOS gated power devices are MOS devices which are selected from the group consisting of power MOSFETS, IGBTs and MOS gated thyristors.

10. The self-starting circuit of claim 5, wherein said MOS gated power devices are MOS devices which are selected from the group consisting of power MOSFETS, IGBTs and MOS gated thyristors.

11. The self-starting circuit of claim 8 wherein said predetermined time delay is about 1 microsecond.

12. The device of claim 7 which further includes undervoltage trip circuit means coupled to and monitoring the voltage at said terminal $V_{CC}$ and having an output coupled to said latch circuit means and to said high side and low side dead time circuits for disabling said latch circuit means and delay circuits when the voltage at said terminal $V_{CC}$ falls below a given value.

13. The integrated circuit of claim 12 wherein said predetermined time delay is about 1 microsecond.

* * * * *